March 7, 1944.  E. S. HINELINE  2,343,257
EXPOSURE GUIDE FOR PHOTOGRAPHIC CAMERAS, PARTICULARLY AERIAL CAMERAS
Filed March 12, 1942  3 Sheets-Sheet 1
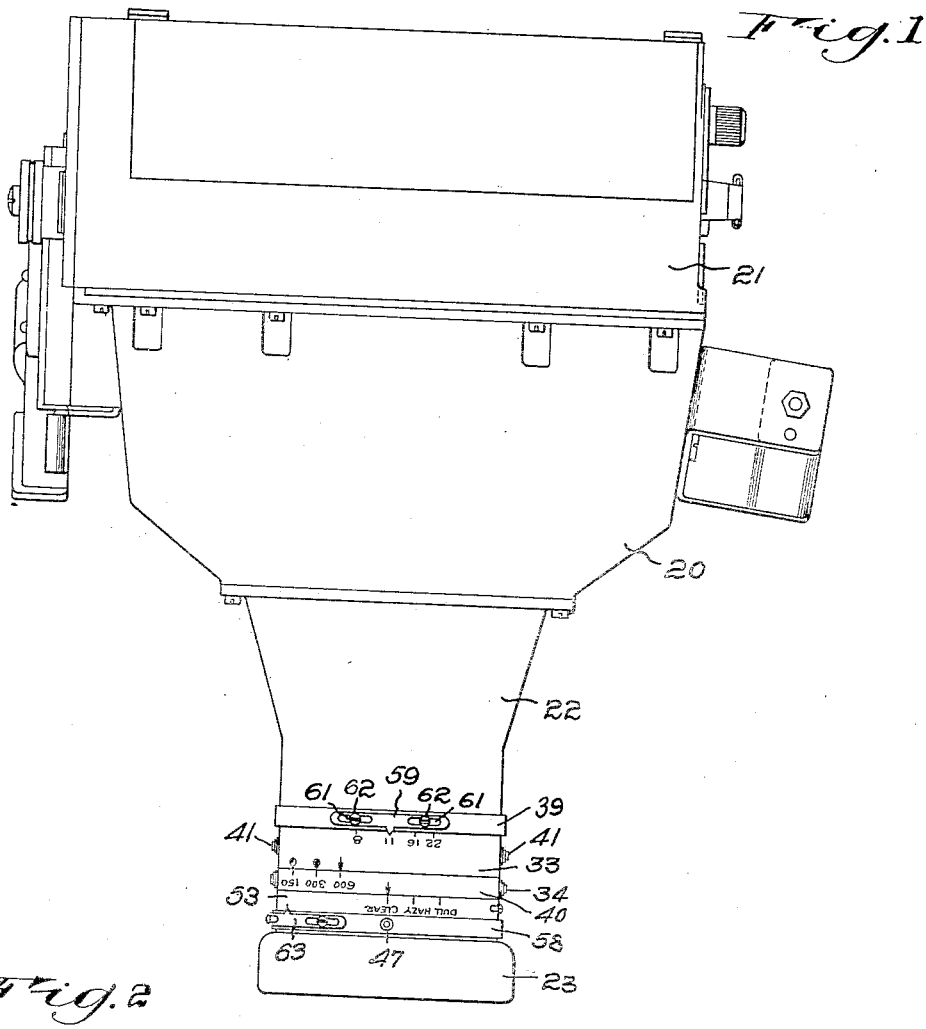

March 7, 1944.    E. S. HINELINE    2,343,257
EXPOSURE GUIDE FOR PHOTOGRAPHIC CAMERAS, PARTICULARLY AERIAL CAMERAS
Filed March 12, 1942    3 Sheets-Sheet 2

INVENTOR.
Edson S. Hineline
BY
his ATTORNEYS

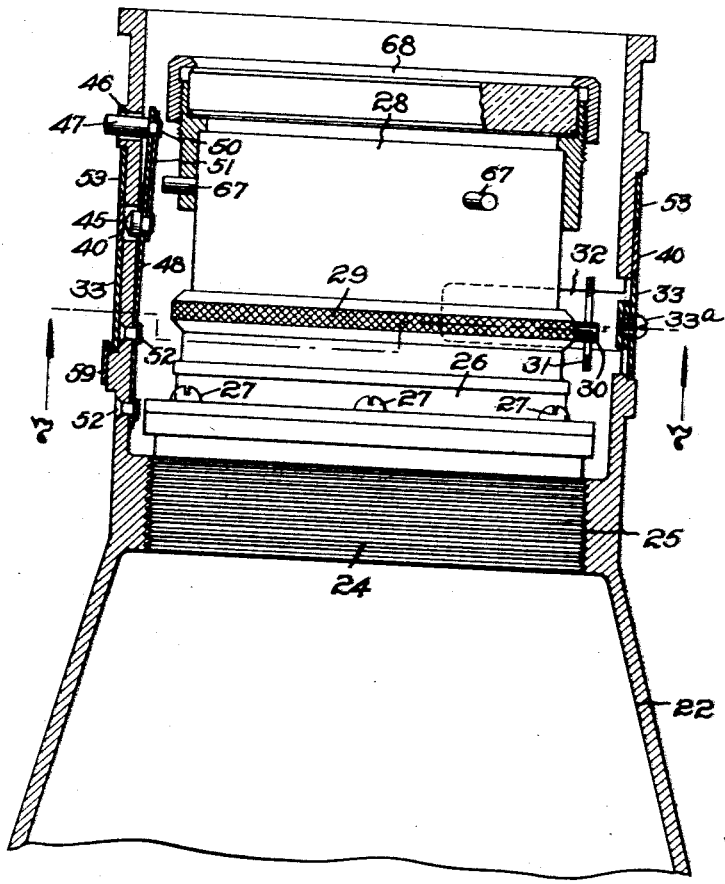

Patented Mar. 7, 1944

2,343,257

UNITED STATES PATENT OFFICE 2,343,257

EXPOSURE GUIDE FOR PHOTOGRAPHIC CAMERAS, PARTICULARLY AERIAL CAMERAS

Edson S. Hineline, Rochester, N. Y., assignor to The Folmer Graflex Corporation, Rochester, N. Y., a corporation of Delaware Application March 12, 1942, Serial No. 434,356

25 Claims. (Cl. 95—64)

This invention relates to a new and improved exposure guide for photographic cameras.

In order that the principle of the invention may be readily understood, a single embodiment thereof applied to an aerial camera, but to which application it is not restricted, is shown in the accompanying drawings, wherein Fig. 1 is a front elevation of an aerial camera substantially as disclosed in the co-pending application of Archie H. Gorey, Louis D. Nadel and Edson S. Hineline, Ser. No. 437,240, filed April 1, 1942, and having the exposure guide of my invention applied thereto;

Fig. 2 is a chart arranged by seasons, broken down into months of the year, and correlated with sensitized material to be used in the said aerial camera;

Fig. 5 is a section through the lens cone, clearly showing the mounting of the lens and the filters therefor;

Fig. 6 is an enlarged fragmentary vertical section similar to Fig. 5 and showing the shutter speed setting ring locking device; and Fig. 7 is a horizontal section through Fig. 5 on the line 7—7 thereof, clearly showing the connection between the diaphragm operating ring and exposure guide diaphragm ring.

There has long been need for an exposure guide that is simple in operation and that requires very little thought on the part of the operator. This is particularly true when the camera is being operated under severe conditions such as is encountered when used on an aerial camera at high altitudes, where the operator's alertness is reduced because of the low air pressure. It is often necessary, particularly in the United States armed forces, to have cameras operated by personnel not especially schooled in the art. Therefore, all adjustments and settings must be reduced to the minimum. In my invention, I disclose an aerial camera equipped with an exposure guide having one member of the exposure guide operatively connected to the lens diaphragm operating ring, shown in Figs. 5 and 7, as will be explained.

Among the objects of this invention are: to provide a simple exposure guide requiring only very simple operations to be performed by the operator; to provide an exposure guide coupled to the diaphragm ring of the aerial camera, thus automatically setting the diaphragm when making that adjustment on the exposure guide; to provide an exposure guide that is readily adjustable for one or more filter factors; to provide an adjustment for the index pointers so that the mechanism can readily be set to the correct position, when installed on the camera; and to provide a simple chart that takes into consideration light conditions with respect to the yearly seasons and the sensitivity of the sensitized material.

Referring more particularly to the drawings: In Fig. 1 is shown the outline of an aerial camera wherein the camera body is indicated at 20, the camera magazine at 21 and the lens cone at 22. Fitted to the forward end of the said lens cone 22 is a rubber or like ring 23 that acts as a shock absorber when the camera is set down on the lens cone thereof, and the said ring also acts as a vibration damper when the camera is held against the window of an airplane when making an exposure. The structure thus far described is not a part of the present invention, but its close relation thereto makes it necessary to make such reference.

Figure 3:
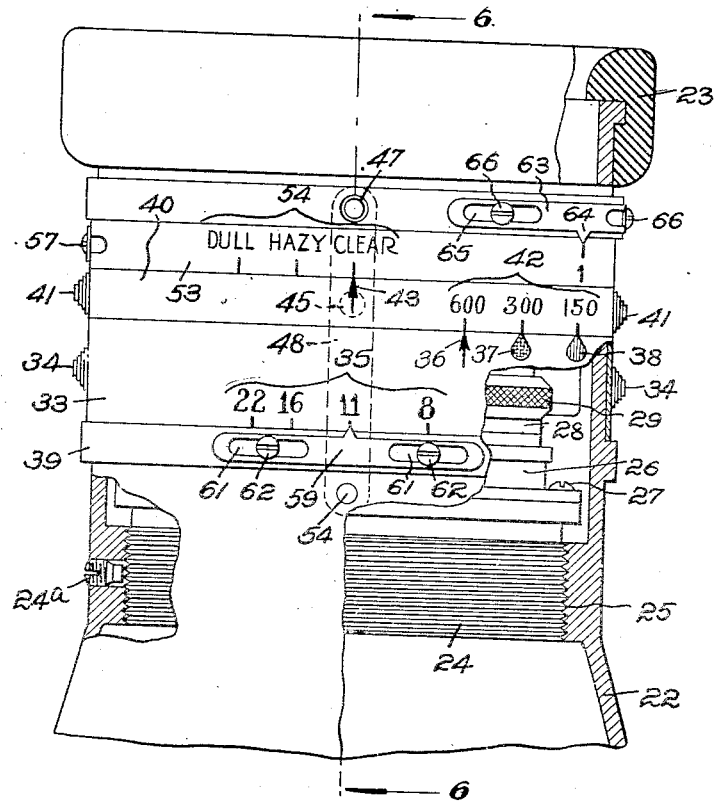
Fig. 3 is a partial front elevation of the aerial camera lens cone, shown partially in section to make more evident the construction of the exposure guide and the lens mounting.
Figure 4:
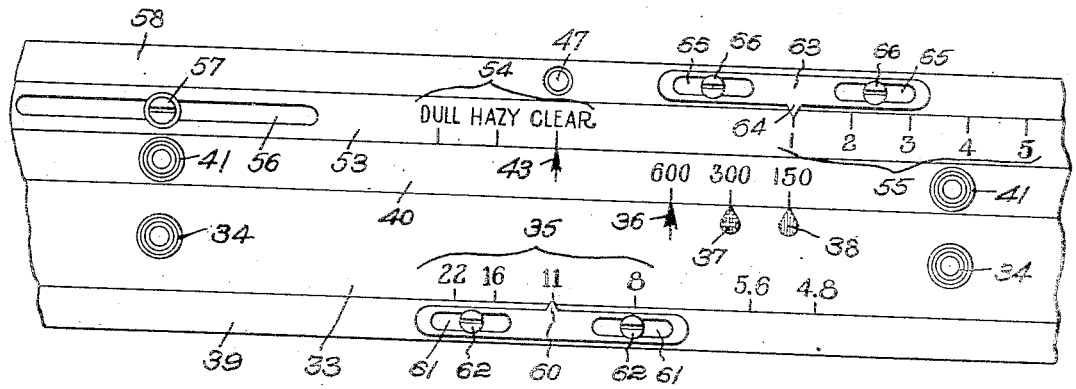
Fig. 4 is a developed view of the components of the exposure guide, made up of rings as shown in Fig. 7.

Referring to Figs. 3, 4 and 5, the lens cone 22 (which, as shown in Figs. 1, 3 and 5, has its forward end of cylindrical shape to receive there hereinafter referred to rings) is provided with a threaded bushing 24 threaded into the lens cone as indicated at 25 and locked from turning by a locking screw 24a. Attached to the said bushing is a lens flange 26 of the conventional type commonly used on photographic lenses and which is attached to the said bushing 24 by screws 27, 27. Threaded into the lens flange 26, in the usual manner, is a lens mount or lens barrel 28 of the usual construction and having a lens diaphragm ring 29 to which is fitted a pin 30, shown in Fig. 5 as engaged by a preferably U-shaped part or member 31, shown in section in Fig. 7, and which rides in a slot or opening 32 of the lens cone 22. The said part or member 31 is shown as formed integral with the diaphragm ring 33 of the exposure guide. Thus said part or member 31 and the exposure guide diaphragm ring 33 are formed of one continuous piece of metal, and the said diaphragm ring 33 is held in position upon the lens cone 22 by means of a screw 33a, most clearly shown in Fig. 7.

It will be noted that any movement of the exposure guide diaphragm ring 33 will cause a corresponding movement to be imparted to the lens diaphragm ring 29, because of the said pin 30 and the U-shaped part or member 31. The said exposure guide diaphragm ring 33 is provided with buttons or projections 34, 34 to assist the operator in rotating said diaphragm ring 33 on the lens cone 22, and said diaphragm ring 33 is provided with calibrations 35 which correspond to or indicate the diaphragm openings. The said diaphragm ring 33 is also provided with three index marks 36, 37, 38, of which the index mark 36 is used when no filter is in place, the index mark 37 is used when a two-time filter is in place, and the index 38 is used when a four-time filter is in place. The index mark 36 is usually filled in in black, the index mark 37 is usually filled in yellow, corresponding to a yellow filter, and the index mark 38 is usually filled in red, corresponding to a red filter. Other indicating colors may be used if desired.

The exposure guide diaphragm ring 33 is held in place on the lens cone 22 by means of a flange 39 shown in Figs. 3 and 4. Also fitted on the said lens cone 22 is a second rotatable ring 40, hereinafter referred to as the shutter speed ring, desirably having knobs 41, 41, for the purpose of rotating said ring 40, and having shutter speed indications or markings 42, and also having a light condition index mark 43.

The said shutter speed ring 40 can be turned on the lens cone 22 when released by the shutter speed lock, most clearly shown in Figs. 5 and 6, and in dotted lines in Fig. 3, and which will now be described. The lens cone 22 is provided with a hole 44 through which passes a preferably cone-shaped or otherwise suitably pointed member 45, and a second hole 46 through which passes a radially extending operating pin 47. The said cone-shaped member 45 and the operating pin 47 are attached to a flat spring lock or member 48 by means of rivets 49, 50 respectively. A reinforcement plate 51 is also held to the said spring lock or member 48 by said rivets, and said spring lock or member 48 is held to the lens cone 22 by rivets 52, 52.

When the said pin 47 is released from manual pressure by the operator, the said spring lock or member 48 moves the member 45 in a left hand direction viewing Figs. 5 and 6, until the shutter speed ring 40 is engaged by the said member 45, thus securely holding the shutter speed ring 40 to any desired position. In order to change the position of the shutter speed ring 40, the operator applies manual pressure inwardly to the said pin 47, thus withdrawing the member 45 from contact with the shutter speed ring 40, and permitting the said shutter speed ring to be turned to any desired extent.

Also mounted on the lens cone 22 is a third ring 53 hereinafter referred to as the light value ring, and which has calibrations indicating light conditions or value, and which is indicated at 54. The said light value ring 53 has a second set of calibrations indicated at 55, consisting of the numerals 1 to 5. These numerals indicate a correlated value of film speed as plotted against the yearly seasons and the latitudes in which the camera is to be used, and herein for simplicity of operation the seasons are represented as broken down into the months of the year.

The said light value ring 53 is provided with an elongated circumferentially extending slot 56 through which passes a screw 57 threaded into the lens cone 22, and which screw is provided for locking the light value ring 53 at a predetermined point or setting, as clearly shown in Fig. 4. The said light value ring 53 is held in place on the lens cone 22 by means of a flange 58.

Attached to the said flange 39 of the lens cone 22 is an index plate 59 having an index pointer 60 projecting therefrom, the said index plate 59 being of a curved formation to fit the said flange 39 and having elongated circumferentially extending openings 61, 61 through which pass screws 62, 62. When said screws are loosened, the index plate 59 may be moved either to the right or to the left so that the index pointer 60 will align with the diaphragm marking 35 when the diaphragm ring 29 is set to any one of the diaphragm opening indications. This adjustment is made only when the lens mount is first installed, and is most readily accomplished by turning the diaphragm ring 29 (Figs. 3 and 7) until the diaphragm is at an opening corresponding to the notation F22.

The exposure guide diaphragm ring 33 will then be in a position where the notation F22 on the exposure guide diaphragm ring 33 should be in alignment with the index pointer 60. If it does not align up correctly, the screws 62, 62 are loosened and the index plate 59 is moved in the proper direction until the index pointer 60 does align with the said notation F22. No further adjustment is required.

An index plate 63 having an index pointer 64 is provided for aligning with the indications 55 of the light value ring 53. The said index plate 63 is provided with elongated circumferentially extending openings 65, 65 through which pass screws 66, 66. The said index plate 63 must be made circumferentially adjustable because the index plate 59 is made circumferentially adjustable as already explained, and since all the indications on each of the several guide rings 33, 40 and 53 are in definite spaced relation to each other, any change in the position of the index plate 59 should be accompanied by a corresponding change in the position of the index plate 63. Said adjustments are manually made, as will be clear from the following explanation of the operation.

In Fig. 5 the lens barrel 28 is shown as provided with radially extending studs 67, 67 for holding a filter mount 68 constituting no part of the present invention, but reference to which is included to make a complete disclosure.

The operation of the exposure guide herein disclosed is as follows, making reference particularly to Figs. 3 and 4.

When the camera is loaded with film of a certain speed, as, for example, "Weston speed rating 120," the operator consults the chart (Fig. 2) for the latitude in which he is operating. For illustration, the chart (Fig. 2) has been compiled for the north temperate zone, and it will be assumed that the camera is being operated during the month of June. The operator will find opposite "June" under column 120, the numeral "1"; the light value ring 53 will then be adjusted so that the numeral "1" of group 55 will be aligned with the index pointer 64. The said light value ring 53 is then locked in place by means of the screw 57, which adjustment need not be changed unless the type of sensitive material is changed or the season of the year changes. The operator then aligns the index mark 43 of the shutter speed ring 40 to accord with the type or kind of day, as, for example, clear, as indicated in Fig. 4. The exposure guide diaphragm ring 33 is then moved until the index point 36 coincides with the shutter speed that is desired to be used. In this instance, it will be 1/600 and the diaphragm will automatically be adjusted to an opening corresponding to F11, as indicated by the index pointer 60.

If the operator is using a two-time yellow filter, the index mark 37 of the exposure guide diaphragm ring 33 will be aligned with the exposure speed selected. If the index mark 37 is aligned with shutter speed 1/600 the index pointer 60 would show that the diaphragm was adjusted to an opening approximately F8. If a shutter speed of 1/300 is used, as shown in Fig. 4, the diaphragm would be stopped down to F11. If a red filter is in place, and a speed of 1/600 is desired, the exposure guide diaphragm ring 33 would be rotated until the index mark 38 coincides with 1/600, thus opening up the diaphragm to a position midway between F8 and F5.6. If a shutter speed of 1/150 is desired with a red filter, the diaphragm opening would be F11, as indicated at Fig. 4.

In an aerial camera, it is usually necessary to operate the camera at a certain shutter speed determined by the altitude and the ground speed of the plane. Since the only three factors the operator needs to know are the shutter speed, the light conditions and the film used, the setting of the diaphragm to the correct position becomes a very simple operation without a great deal of thought on the part of the operator, and this is very important because such operator frequently has to act very quickly, and he may have other duties to occupy his attention in addition to making photographs, and moreover he may not be a skilled photographer.

In the usual equipment, the operator would have to consult various charts to determine the shutter speed and his diaphragm opening, to ascertain the correct value for making the exposure. Since on a given mission the only value likely to change is the light condition as represented by dull, hazy or clear, the operator need merely adjust the light value or shutter speed ring 40 to the light condition and make a corresponding adjustment of the exposure guide diaphragm ring 33 to select the correct aperture, so as correctly to expose the negative.

The sensitized material speed rating used in the disclosed embodiment of the invention is the well known Weston speed rating. Obviously charts could be provided for any other speed rating such as the Schiner or the H. & D. The Weston rating, however, is almost universally used in this country. The Weston ratings given in the chart (Fig. 2) are sufficient to cover all existing types of sensitized material likely to be used in an aerial camera. Obviously my invention is not limited to three values, as charts can be used giving values in any number of steps. When this exposure guide is applied to a camera used on the ground, a chart having a full range of speeds is supplied.

The invention herein disclosed has been thoroughly tested and has proved to be entirely practical both in the air and on the ground, and provides adjustments sufficiently close to insure correctly exposed negatives. The structure is very simple and can be very economically manufactured and in no way interferes with the normal operation of the camera to which it is applied.

Having thus described one illustrative embodiment of the invention, it is to be understood that although specific terms are employed, they are used in a generic and descriptive sense and not for purposes of limitation, the scope of the invention being set forth in the following claims.

I claim:

1. In combination, a photographic exposure guide and a correlated aerial camera, said camera having a lens cone with a movable lens diaphragm operating ring therein, said exposure guide being mounted upon said lens cone adjacent said operating ring, and consisting of several co-related movable members each carrying indicia and an index, all said members being mounted in respective edge-to-edge relation and guided in their movements upon the surface of said lens cone and being relatively movable along each other lengthwise of said respective edges, to bring such indicia markings and indices thereon into the desired accord, one of said members being movable for adjusting the said lens diaphragm in said lens cone in accordance with such lengthwise change in the edge-to-edge relationship of the several members of said exposure guide, said last mentioned member of said movable exposure guide and said lens diaphragm operating ring being operatively mechanically connected for such purpose, whereby the lens diaphragm in said lens cone is automatically set by the desired adjusting movement by the operator of the said last mentioned member of said exposure guide, as determined by such lengthwise change in said edge-to-edge relationship of said several members of said exposure guide.

2. In combination, a photographic exposure guide and a correlated aerial camera, said camera having a lens cone with a movable lens diaphragm operating ring therein, said exposure guide being mounted exteriorly upon the lens cone in the vicinity of the lens diaphragm operating ring, and consisting of several co-related members all movably mounted, and one of said members being operatively connected to said lens diaphragm operating ring, each of said members carrying indicia and an index, all said members being mounted in respective edge-to-edge relation and guided in their movements upon the surface of said lens cone and being relatively movable along each other lengthwise of said respective edges, to bring such indicia markings and indices thereon into the desired accord.

3. In combination, a photographic exposure guide and a correlated aerial camera, said camera having a lens cone with a movable lens diaphragm operating ring therein, said exposure guide being mounted exteriorly upon the lens cone in the vicinity of the lens diaphragm operating ring, consisting of several co-related members all movably mounted, and one of said members being operatively connected to said lens diaphragm operating ring, whereby an adjusting movement of said last mentioned member of said exposure guide automatically sets the lens diaphragm through the resulting movement of the lens diaphragm operating rings, said several members each carrying indicia and an index, all said members being mounted in respective edge-to-edge relation and guided in their movements upon the surface of said lens cone and being relatively movable along each other lengthwise of said respective edges, to bring such indicia markings and indices thereon into the desired accord, said members including an exposure-guide diaphragm ring whose calibrations are indicative of the diaphragm openings, said members being mounted for turning movement through manual manipulation of the operator.

4. In combination, a photographic exposure guide and a correlated aerial camera, said camera having a lens cone with a movable lens diaphragm operating ring therein, said exposure guide being mounted exteriorly upon the lens cone in the vicinity of the lens diaphragm operating ring, consisting of several co-related members all movably mounted, and one of said members being operatively connected to said lens diaphragm operating ring, whereby an adjusting movement of said last mentioned member of said exposure guide automatically sets the lens diaphragm through the resulting movement of the lens diaphragm operating ring, said several members each carrying indicia and an index, all said members being mounted in respective edge-to-edge relation and guided in their movements upon the surface of said lens cone and being relatively movable along each other lengthwise of said respective edges, to bring such indicia markings and indices thereon into the desired accord, said members including an exposure-guide diaphragm ring whose calibrations are indicative of the diaphragm openings, said members being mounted for turning movement through manual manipulation of the operator, said exposure guide also including among said several co-related members a second ring, the calibrations whereof are indicative of shutter speed, said second ring being circumferentially adjustable.

5. In combination, a photographic exposure guide and a correlated aerial camera, said camera having a lens cone with a movable lens diaphragm operating ring therein, said exposure guide being mounted exteriorly upon the lens cone in the vicinity of the lens diaphragm operating ring, consisting of several co-related members all movably mounted, and one of said members being operatively connected to said lens diaphragm operating ring, whereby an adjusting movement of said last mentioned member of said exposure guide automatically set the lens diaphragm through the resulting movement of the lens diaphragm operating ring, said several members each carrying indicia and an index, all said members being mounted in respective edge-to-edge relation and guided in their movements upon the surface of said lens cone and being relatively movable along each other lengthwise of said respective edges, to bring such indicia markings and indices thereon into the desired accord, said members including an exposure-guide diaphragm ring whose calibrations are indicative of the diaphragm openings, said members being mounted for turning movement through manual manipulation of the operator, said exposure guide also including among said several corelated members a second ring, the calibrations whereof are indicative of shutter speed, said second ring being circumferentially adjustable, and means for releasably holding said second ring against movement.

6. In combination, a photographic exposure guide and a correlated aerial camera, said camera having a lens cone with a movable lens diaphragm operating ring therein, said exposure guide being mounted exteriorly upon the lens cone in the vicinity of the lens diaphragm operating ring, consisting of several co-related members all movably mounted, and one of said members being operatively connected to said lens diaphragm operating ring, whereby an adjusting movement of said last mentioned member of said exposure guide automatically sets the lens diaphragm through the resulting movement of the lens diaphragm operating ring, said several members each carrying indicia and an index, all said members being mounted in respective edge-to-edge relation and guided in their movements upon the surface of said lens cone and being relatively movable along each other lengthwise of said respective edges, to bring such indicia markings and indices thereon into the desired accord, said members including an exposure-guide diaphragm ring whose calibrations are indicative of the diaphragm openings, said members being mounted for turning movement through manual manipulation of the operator, said exposure guide also including among said several corelated members a second ring, the calibrations whereof are indicative of shutter speed, said second ring being circumferentially adjustable, said exposure guide also including among said several co-related members a third ring mounted upon the lens tube and having its calibrations indicative of co-relation of film speed with the season of the year and the latitude, said third ring being circumferentially adjustable.

7. A photographic exposure guide for a photographic camera that is provided with a prolonged, tubular lens and lens-diaphragm-carrying forward portion with spaced, guide-confining formations to receive such guide, the latter consisting of several co-related members all adapted to mounted for turning movement on said tubular portion in proximity to the lens diaphragm ring thereof and in immediate proximity to each other, one of said members being adapted to be operatively connected to said ring so that such movement of such last mentioned member of the exposure guide automatically sets the lens diaphragm, said exposure guide including among its said members a movable exposure guide diaphragm ring-like means having calibrations, of diaphragm openings thereon, and also having filter indications thereon, said exposure guide also including among said several co-related members a second ring in parallelism and in proximity to the said exposure guide diaphragm ring-like means and circumferentially adjustable, and having thereon indicia of shutter speed that can be brought into alignment with the filter indications on said ring-like means, said exposure guide also including among said several co-related members a third ring mounted in parallelism to and in proximity to said second ring and having calibrations thereon indicating co-relation of film speed with the period of the year and the latitude, said third ring being circumferentially adjustable so that it can be set according to film speed and the calibrations thereon aligned with indicia on said second ring, said three rings in addition to the calibrations and indicia thereon having indices thereon to be brought into the desired accord with said calibrations and indicia by turning movement of said several rings, said three rings being of a size and shape adapting them to be placed in the herein defined assembled relation between such spaced guide-confining formations on said tubular, forward portion of the camera.

8. A photographic exposure guide for an aerial camera provided with a lens cone having a substantially cylindrical prolongation itself having spaced, guide-confining, flange-like formations, said exposure guide being mountable upon the exterior of the lens cone prolongation, said exposure guide including an exposure guide diaphragm ring adapted to be mounted on said prolongation for manual turning movement and adapted to be operatively connected to the lens diaphragm ring of the camera within said lens cone, said exposure guide also including adjacent circumferentially adjustable rings having markings thereon for shutter speed and for light value respectively, and according to the markings whereof the first mentioned exposure guide diaphragm ring is manually turned, said exposure guide rings all being receivable on said prolongation between said spaced, guide-confining, flange-like formations, said rings, in addition to the markings thereon, having indices to be brought into the desired accord with said markings by turning movement of the several rings.

9. A photographic exposure guide for an aerial camera provided with a lens cone having a substantially cylindrical prolongation itself having spaced, guide-confining, flange-like formations, said exposure guide being mountable upon the exterior of the lens cone prolongation, said exposure guide including an exposure guide diaphragm ring adapted to be mounted on said prolongation for manual turning movement and adapted to be operatively connected to the lens diaphragm ring of the camera within said lens cone, said exposure guide also including two adjacent rings respectively marked for shutter speed and for light value, both of said last mentioned rings being mountable for adjusting turning movement, and means on said lens cone prolongation for locking the shutter-speed marked ring in place, said exposure guide rings all being receivable on said prolongation between said spaced, guide-confining, flange-like formations, said rings, in addition to the markings thereon, having indices to be brought into the desired accord with said markings by turning movement of the several rings.

10. In combination, a correlated aerial camera provided with a lens cone having a substantially cylindrical prolongation, said prolongation having spaced, guide-confining, flange-like formations, and a photographic exposure guide mounted upon the said prolongation of the lens cone of the camera, said exposure guide having an exposure guide diaphragm ring operatively connected to the lens diaphragm operating ring of the camera within said prolongation, whereby the lens diaphragm of the camera is automatically set when making the desired adjustment of said exposure guide diaphragm ring, said exposure guide ring having calibrations thereon of diaphragm markings, said exposure guide also having a shutter speed ring parallel to and in proximity to said exposure guide diaphragm ring and having indicia thereon of shutter speed, the said lens cone prolongation having mounted upon the inside thereof releasable holding means to engage said shutter speed ring and thereby hold it in position, said exposure guide rings all being receivable on said prolongation between said spaced, guide-confining, flange-like formations, said rings, in addition to the markings thereon, having indices to be brought into the desired accord with said markings by turning movement of the several rings.

11. In combination, a correlated aerial camera provided with a lens cone having a substantially cylindrical prolongation, said prolongation having spaced, guide-confining, flange-like formations, and a photographic exposure guide mounted upon the said prolongation of the lens cone of the camera, said exposure guide having an exposure guide diaphragm ring operatively connected to the lens diaphragm operating ring of the camera within said prolongation, whereby the lens diaphragm of the camera is automatically set when making the desired adjustment of said exposure guide diaphragm ring, said exposure guide diaphragm ring having calibrations thereon of diaphragm markings, said exposure guide also having a shutter speed ring parallel to and in proximity to said exposure guide diaphragm ring and having indicia thereon of shutter speed, the said lens cone prolongation having mounted upon the inside thereof releasable holding means to engage said shutter speed ring and thereby hold it in position, and an operating member connected to said releasable holding means and extending through the wall of the lens cone into position to be engaged by the operator for releasing the said holding means, said exposure guide rings all being receivable on said prolongation between said spaced, guide-confining, flange-like formations, said rings, in addition to the markings thereon, having indices to be brought into the desired accord with said markings by turning movement of the several rings.

12. A photographic aerial camera having a lens cone with a substantially cylindrical, forward prolongation within which the lens, lens diaphragm and lens-diaphragm operating ring are mounted, and a cooperating exposure guide consisting of co-related members mounted for turning movement upon said prolongation adjacent the lens diaphragm operating ring thereof and adapted to be connected operatively to the said lens diaphragm operating ring, said exposure guide diaphragm ring having calibrations indicative of diaphragm markings, and an adjustable index plate mounted upon the camera lens cone prolongation adjacent to said calibrations, said exposure guide also including among its said several co-related members another ring mounted in proximity to the said exposure guide diaphragm ring and having calibrations thereon, there being an adjustable index plate mounted upon the camera lens prolongation adjacent to said last mentioned ring, and in alignment with the index point whereof the calibrations of said last mentioned ring may be brought into alignment, said rings, in addition to the calibrations thereon, having indices to be brought into the desired accord with such calibrations by turning movement of said rings.

13. In combination, a photographic exposure guide and a co-related aerial camera, said camera having a lens cone provided with a forward, terminal, cylindrical, end portion within which is mounted a movable lens-diaphragm ring; the said exposure guide being mounted exteriorly upon the said cylindrical end portion of the lens cone in the vicinity of the said lens-diaphragm operating ring; said cylindrical portion of the lens cone having two spaced, encircling, flange-like formations between which are received said exposure guide and by which said guide is held in place, said exposure guide including three rotatable rings all received in a respective edge-to-edge relation upon said cylindrical portion between said flange-like formations, so as to be held in place thereby, said three rings being an exposure-guide diaphragm ring connected to said lens-diaphragm ring, a shutter speed ring, and a light-value ring, each of said three rings having appropriate calibrations or indicia markings.

14. A photographic exposure guide and a co-related aerial camera in accordance with claim 13, but wherein the said cylindrical portion of the lens cone of the camera is provided with an interiorly mounted lock to engage and lock in place the shutter speed ring.

15. A photographic exposure guide and a co-related aerial camera in accordance with claim 13, but wherein the cylindrical portion of the lens cone is provided with an opening overlaid by the said shutter speed ring, and wherein there is a lock mounted upon the inner face of the said cylindrical portion of the lens cone and positioned to engage the inner surface of said shutter speed ring to lock the same in place.

16. A photographic exposure guide and a co-related aerial camera in accordance with claim 13, but wherein the cylindrical portion of the lens cone is provided with an opening overlaid by the said shutter speed ring, and wherein there is a lock mounted upon the inner face of the said cylindrical portion of the lens cone and positioned to engage the inner surface of said shutter speed ring to lock the same in place, the said cylindrical portion of the lens cone having mounted therein an operating pin accessible to the operator and connected to said lock.

17. A photographic exposure guide and a co-related aerial camera in accordance with claim 13, but wherein the cylindrical portion of the lens cone is provided with an opening overlaid by the said shutter speed ring, and wherein there is a lock mounted upon the inner face of the said cylindrical portion of the lens cone and positioned to engage the inner surface of said shutter speed ring to lock the same in place, the said cylindrical portion of the lens cone being provided with an opening and an operating pin accessible to the operator received in said opening and connected to the said lock.

18. A photographic exposure guide and co-related aerial camera in accordance with claim 13, but wherein the two flange-like formations are respectively provided with circumferentially adjustable index plates, each relating to the ring of the exposure guide which is located next to such index plate.

19. A photographic exposure guide and corelated aerial camera in accordance with claim 13, but wherein the said cylindrical portion of the lens cone is provided with two through-openings 44, 46, said opening 44 being covered by the shutter speed ring, and wherein a spring lock 48 is secured to the inner face of said cylindrical portion of the lens cone and is provided with a projection 45 in said opening 44 to engage with the inner face of the said shutter speed ring, and wherein said spring lock is also provided with an operating pin 47 received in the said opening 46 so as to be accessible to the operator for releasing said shutter speed ring.

20. In combination, a photographic exposure guide and a co-related aerial camera, said camera having a lens cone provided with a forward end portion, within which is mounted a movable lens diaphragm operating ring; the said exposure guide being exteriorly mounted upon said lens cone in the vicinity of the said lens diaphragm operating ring; said lens cone having two spaced, encircling, flange-like formations upon which is received said exposure guide and by which said guide is held in place, said exposure guide including three rotatable rings all received in a respective edge-to-edge relation upon the outer surface of said cone ring between said flange-like formations so as to be held in place thereby, said three rings being an exposure-guide diaphragm ring connected to said lens-diaphragm ring, a shutter speed ring and a light-value ring, each of said three rings having appropriate calibrations or indicia markings.

21. In combination, a photographic exposure guide and a co-related aerial camera, the latter having a lens cone provided with a forward end portion within which is mounted a movable lens-diaphragm operating means, said exposure guide being exteriorly mounted upon said lens cone in the vicinity of said lens-diaphragm operating means, said lens cone having spaced opposed formations between which is received said exposure guide and by which said guide is held in place, said exposure guide including three guide members all received in a respective, substantially edge-to-edge relation upon the outer surface of said cone portion between said opposed spaced formations, so as to be held in place thereby, said three guide members being an exposure-guide diaphragm member connected to said lens diaphragm means, a shutter speed member and a light-value member, each of said three members having appropriate calibrations or indicia markings.

22. In combination, a photographic exposure guide and a co-related aerial camera, the latter having a lens cone provided with a forward end portion within which is mounted a movable lens-diaphragm operating means, said exposure guide being exteriorly mounted upon said lens cone in the vicinity of said lens-diaphragm operating means, said lens cone having spaced opposed formations between which is received said exposure guide and by which said guide is held in place, said exposure guide including at least two guide members, all of which are received in a respective, substantially edge-to-edge relation upon the outer surface of said cone portion between said opposed spaced formations so as to be held in place thereby, said guide members including an exposure-guide diaphragm member connected to said lens diaphragm means and a speed diaphragm member, each of said several guide members having appropriate calibrations or indicia markings.

23. In combination, a photographic exposure guide and a co-related aerial camera, the latter having a lens cone provided with a forward end portion within which is mounted a movable lens-diaphragm operating means, said exposure guide being exteriorly mounted upon said lens cone in the vicinity of said lens-diaphragm operating means, said lens cone having spaced opposed formations between which is received said exposure guide and by which said guide is held in place, said exposure guide including at least two guide members, all of which are received in a respective, substantially edge-to-edge relation upon the outer surface of said cone portion between said opposed spaced formations so as to be held in place thereby, said guide members including an exposure-guide diaphragm member connected to said lens diaphragm means, each of said several guide members having appropriate calibrations or indicia markings.

24. A structure in accordance with claim 21, but wherein said forward end portion of the lens cone of the aerial camera is provided with an interiorly mounted lock to engage and lock in place the shutter speed member.

25. A structure in accordance with claim 21, but wherein said forward end portion of the lens cone of the aerial camera is provided with an opening overlaid by said shutter speed member, and wherein there is a lock mounted upon the inner face of said forward end portion of the lens cone and positioned to engage the inner face of said shutter speed member to lock the same in place.

EDSON S. HINELINE.